United States Patent [19]

Hatsutta et al.

[11] Patent Number: 4,753,479
[45] Date of Patent: Jun. 28, 1988

[54] THIGH SUPPORT DEVICE IN A SEAT FOR VEHICLES

[75] Inventors: Susumu Hatsutta, Akishimashi; Yasuji Ikisu, Tokyo, both of Japan

[73] Assignees: Mitsubishi Motor Corp., Tokyo; Tachikawa Spring Co. Ltd., Kishinashi, both of Japan

[21] Appl. No.: 659,627

[22] Filed: Oct. 11, 1984

[51] Int. Cl.$^4$ .................................................. A47C 3/20
[52] U.S. Cl. ................................... 297/284; 297/313; 297/458
[58] Field of Search ............... 297/284, 313, 458, 328, 297/345, 347

[56] References Cited

U.S. PATENT DOCUMENTS

| | | | |
|---|---|---|---|
| 2,139,028 | 12/1938 | Mensendicck et al. | 297/284 |
| 3,632,166 | 1/1972 | Lohr | 297/284 |
| 4,067,533 | 1/1978 | Kazaoka et al. | 297/328 X |
| 4,295,682 | 10/1981 | Kluting et al. | 297/366 X |
| 4,339,103 | 7/1982 | Mori et al. | 297/328 X |
| 4,487,390 | 12/1984 | Miyashita | 297/313 X |
| 4,491,365 | 1/1985 | Murakami | 297/284 X |
| 4,522,445 | 6/1985 | Goldner et al. | 297/284 |
| 4,529,159 | 7/1985 | Terada et al. | 297/313 X |

FOREIGN PATENT DOCUMENTS

| | | | |
|---|---|---|---|
| 2724725 | 12/1977 | Fed. Rep. of Germany | 297/284 |
| 2822766 | 12/1978 | Fed. Rep. of Germany | 297/284 |
| 190060 | 12/1983 | Japan . | |
| 70242 | 4/1984 | Japan . | |
| A2120092 | 11/1983 | United Kingdom | 297/313 |
| A2120093 | 11/1983 | United Kingdom | 297/313 |

Primary Examiner—Peter A. Aschenbrenner
Assistant Examiner—Thomas A. Rendos
Attorney, Agent, or Firm—Hoffmann & Baron

[57] ABSTRACT

In a device for adjusting the support pressure of the passenger's thighs by raising or lowering a thigh support part in a seat cushion, a lock mechanism is mounted both in a seat frame and the thigh support pipe which rotates in the up and down directions of said seat frame. The lock mechanism consists of a lock piece pivotally fixed to a rotating shaft disposed horizontally in the thigh support pipe, a stopper which engages with the lock piece mounted rotatably free to the thigh support pipe and a lock release lever which releases a locking state by pushing said stopper in the direction opposite to its engaging direction.

6 Claims, 3 Drawing Sheets

F I G. I
(PRIOR ART)
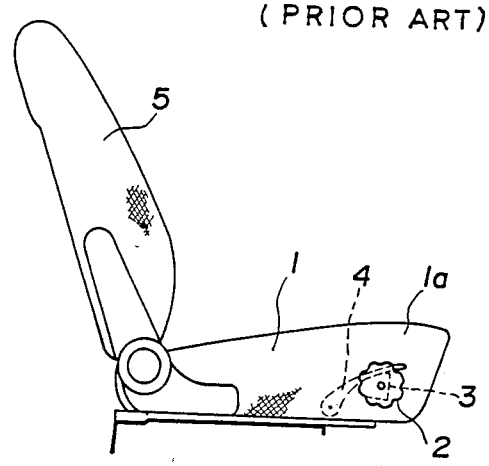
F I G. 4
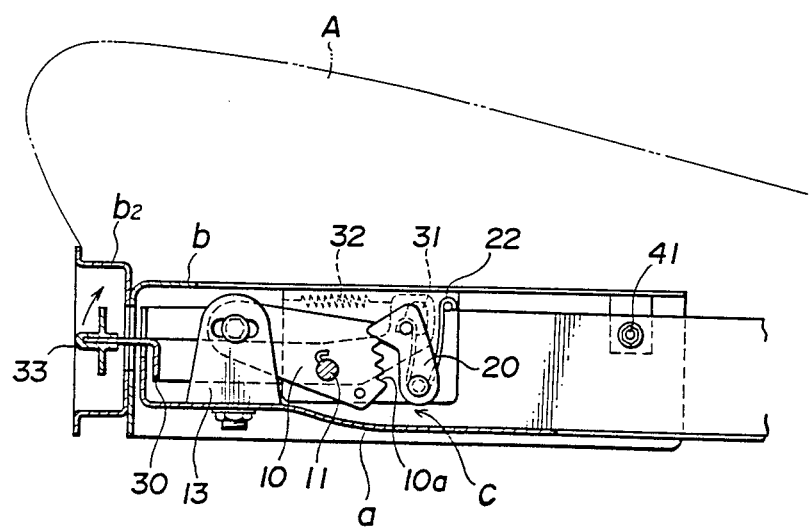

THIGH SUPPORT DEVICE IN A SEAT FOR VEHICLES

BACKGROUND OF THE INVENTION

The present invention relates to thigh support devices for seat cushions employed in vehicles, such as automobiles, and, in particular, relates to a device for adjusting the support pressure exerted against the thighs of a person sitting on the seat by movement of the thigh support up and down.

It has been known to construct conventional thigh support devices, as shown in FIG. 1, so that it can be operated by an operating handle (2) which is mounted on the side of a cushion so that an eccentric cam (3) located in seat cushion (1) can be operated to move an elevating plate (4) up and down thereby adjusting a thigh support part (1a) formed separately from the seat cushion (1) and back portion (5) of a vehicle seat. Since, however, the construction requires operation from the outside of the seat cushion (1), it is necessary to provide a space for such operation between the side surface of the seat cushion (1) and the inside wall surface of the car. Consequently, a size limitation is imposed upon the wideness of the seat which can be installed with such thigh support devices. Moreover, the construction is overly complicated and the operability of the eccentric cam (3) is not good.

The present invention is directed at eliminating these and other problems associated with conventional devices of this nature. For example, one object of the present invention is to eliminate the space requirement between the wall surface of the car and the seat necessary with conventional devices for installing the operating part of a thigh support device.

SUMMARY OF THE INVENTION

The present invention is a thigh support device for a vehicle which is located in a seat cushion which can be lifted by pulling up a thigh support frame forming part of the thigh support device. Further in accordance with the present invention, the operating portion of the device is mounted directly to the thigh support frame so that the thigh support frame can be moved up and down together with the operating portion. The operating portion is fixed so that it is always within reach of the passengers hand.

As a result of this construction there can be provided a thigh support device which does not require operating space between the side of the seat and the inside wall of the car. Thus a wider seat can be installed. Furthermore, as a result of the construction of the present invention the operation of the device is simplified and the operating part can be fixed to the seat at a location which is always within the reach of the passenger's hand. Furthermore as a result of the present invention, a thigh support device having a simpler construction and, consequently, a lower cost is provided.

This is achieved by the thigh support device which is constructed so that the thigh support part is lifted by directly pulling up a thigh support frame or thigh support part.

BRIEF DESCRIPTION OF THE DRAWINGS

FIG. 1 is a side elevational view of a seat equipped with a conventional thigh support device;

DETAILED DESCRIPTION OF THE INVENTION

Figure 2:
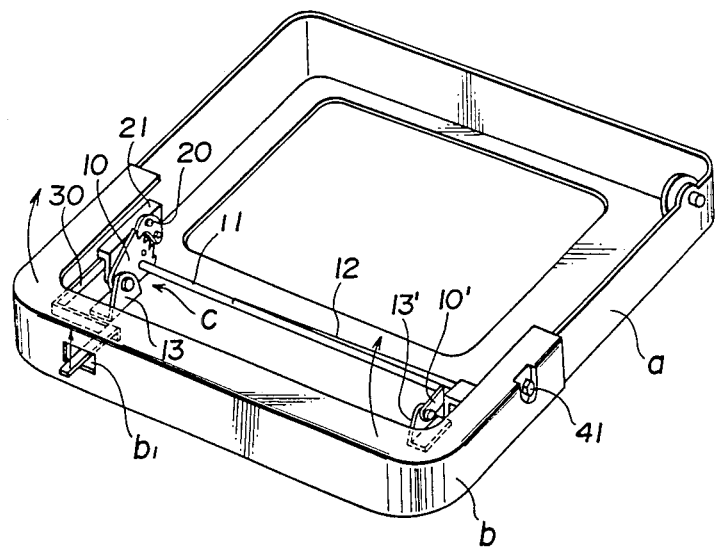
FIG. 2 is a perspective view of a thigh support device according to the present invention.
Figure 3:
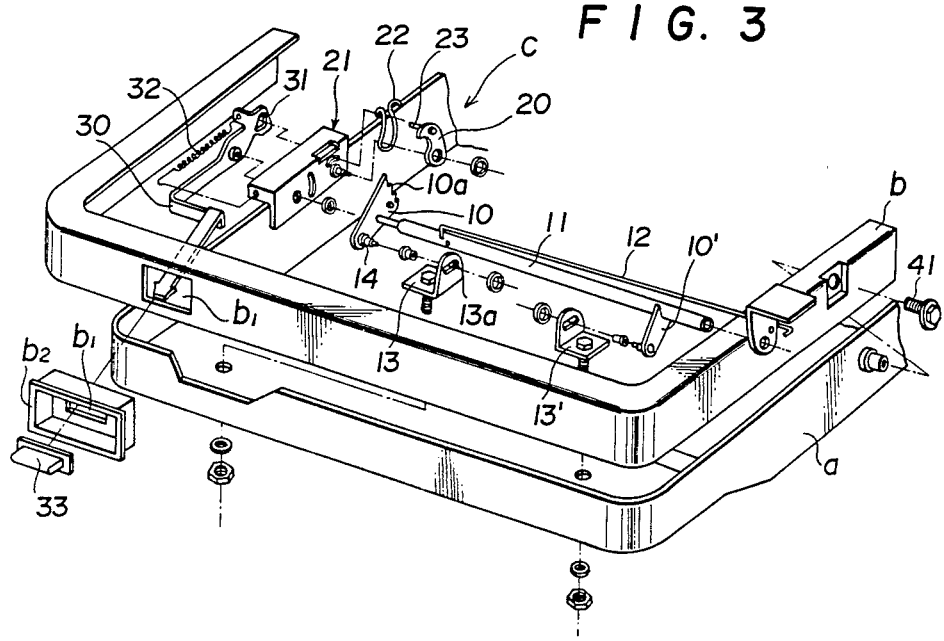
FIG. 3 is an exploded perspective view of the thigh support device as shown in FIG. 2, and FIGS. 4-6 are elevated cross-sectional views showing operation of the device in accordance with the present invention.

The present invention will be described in detail with reference to the drawings.

In the Figures, there can be seen a seat frame (a) and a thigh support frame (b) having a block U-shape which is pivotally fixed to the front part of the seat frame (a) so that it can rotate up and down with respect thereto.

The thigh support frame (b) is formed so that it conforms to the shape of the front part of the seat frame (a). Both of the free ends of the U-shaped thigh support frame (b) are pivotally fixed to the seat frame (a) by means of a bolt (41) so that the thigh support frame (b) rotates around the axis of rotation of the pivotally fixed parts. A seat cushion can be formed by placing a cushiony material made of, for example, a foam material, in the space from the top of the thigh support frame (b) to the rear part of the seat frame (a), and can also include covering with a top material. A gripping part ($b_2$) for easy pulling of the thigh support frame (b) is mounted on the outer side of the thigh support frame (b). Furthermore, a lock mechanism (c) is mounted along the thigh support frame (b) and the seat frame (a), and the elevating movement of the thigh support frame (b) is controlled by means of the locking mechanism (c).

The lock mechanism (c), as illustrated in the Figures, consists of a lock piece (10) pivotally fixed to a rotating shaft (11) which is mounted on the seat frame (a) and horizontally disposed with respect to the thigh support frame (b); a stopper (20) for engaging with the lock piece (10), which is mounted rotatably free to a gear case (21); and a lock release lever (30), which releases the lock by pushing the stopper (20) in the direction opposite the engaging direction.

After release from a locking condition, the rotating shaft (11) rotates by action of a return spring (12) so that the stopper (20) can engage with the top lock slot (10a) of the lock piece (10). In the Figures, a hole ($b_1$) is provided in the gripping part ($b_2$) and the thigh support frame (b) to accommodate the lock release lever (30).

The lock piece (10) is provided with lock slots (10a) formed up and down the peripheral edge of the lock piece (10) directly opposite the stopper (20), and is fixed at its center to the rotating shaft (11) for rotation therewith. A pin (14) is provided for insertion into an elongated hole (13a) of a bracket (13), which, in turn, is fixed to the seat frame (a). The lock piece (10) rotates with the rotating shaft (11) as the axis of rotation.

A lock release pin (23) is provided for releasing the stopper from the locking condition, such pin (23) formed as a projection from the side surface at the top of the stopper (20) which is inserted into a bore (31) with a camming surface provided at the tip of lock release lever (30). Therefore, by operating the lever (30), the pin (23) of the stopper and, consequently, the stopper (20) itself, is pushed in the direction whereby the stopper (20) is disengaged from the slot (10a) so that the lock piece (10) is released.

As described above, the lock release lever (30), provided with the bore (31) at the tip thereof, is connected to the rotating shaft (11) and is biased by the action of spring (32) such that the engaging hole (31) urges the pin (23) in the engaging direction of the stopper (20). An operating knob (33) is provided on lever (30) in the gripping part ($b_2$) of the thigh support frame (b). The gripping part ($b_2$) is fixed to the thigh support frame (b) by a suitable method. The seat frame (a) and the thigh support frame (b) are connected on the opposite side of the lock mechanism through a bracket (13'), a link (10') and rotating shaft (11) which is fixed on the thigh support frame (b). The link (10') is fixed to the rotating shaft (11), while the bracket (13') is fixed to the seat frame (a), and the link (10') and the bracket (13') are interconnected to each other for free rotation therebetween.

Figure 5:
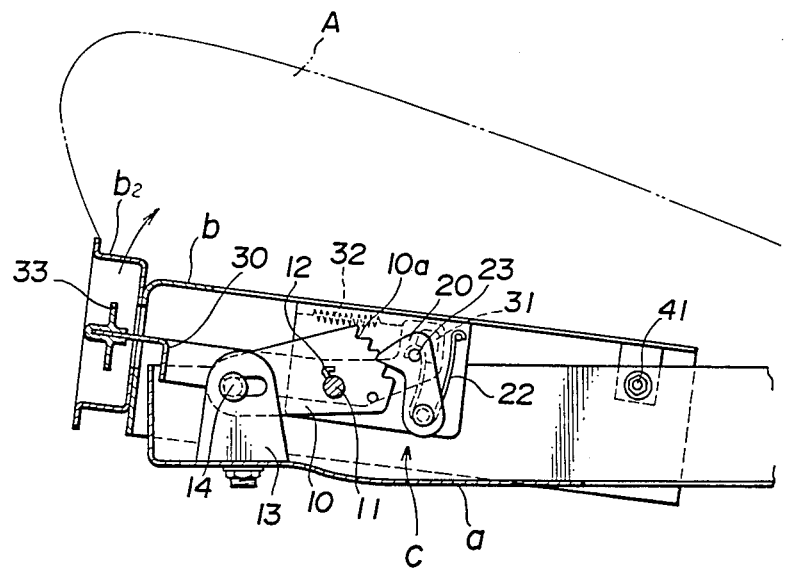
Figure 6:
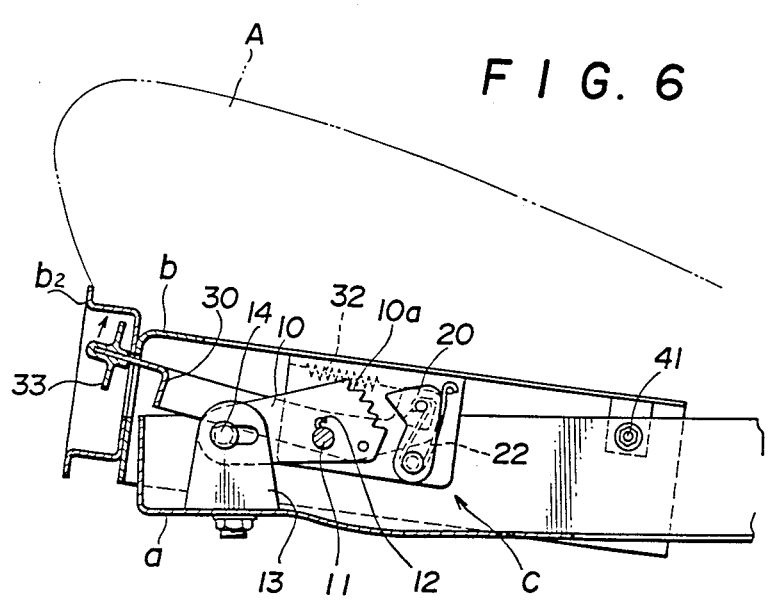

FIG. 4 to FIG. 6 show the operation of the device according to the present invention. In FIG. 4 a thigh support part (A) of a seat cushion is positioned at its lowest elevation, and the stopper (20) is engaged with the top slot (10a) of the lock piece (10) so as to lock the device in that condition.

FIG. 5 shows the case where the support part (A) has been pulled up by pulling up the thigh support frame (b), which can be accomplished by catching the gripping part ($b_2$) of the thigh support frame (b) with a finger as it is in the condition shown in FIG. 4. That is, when the gripping part ($b_2$) is lifted, the rotating shaft (11) moves upward accordingly thereby raising the lock piece (10) fixed to the rotating shaft (11). Meanwhile the stopper (20) moves from an upper slot (10a) over to a lower slot (10a) to engage therewith thereby establishing a locked condition in a lower lock slot.

FIG. 6 shows the operation whereby the thigh support part (A) is lowered. When the operating knob (33) of the lock release lever (30) is raised thereby pulling against the elasticity of the spring (32) (i.e., raised in the direction of the arrows shown in FIG. 6), the lever (30) rotates around the rotating shaft (11) so that the pin (23) of the stopper (20), which passes through the camming bore (31), is pushed in the lock release direction of stopper (20) so that the stopper (20) is disengaged from the lock piece (10).

Therefore the thigh support part (A) descends by the weight of the thigh support frame (b) and the weight of the passenger, etc. Thereafter, when the operating knob (33) of the lever (30) is released, the spring (22) urges the stopper (20) to return to engagement with a lock slot (10a) of the lock piece (10) thereby establishing a locking condition. Meanwhile, the rotating shaft (11) and the lock piece (10) rotate by the action of return spring (12) so that the stopper (20) engages with lock piece (10) in an arbitrary position of the thigh support part (A) and is locked there.

Since the present invention is constructed as described above, it has the following advantages and effects. Since the thigh support in the seat cushion can be raised by pulling the thigh support frame, there is no need to provide the operating part at the side of the seat cushion as was required in conventional devices. Therefore, the space for operation between the side surface of the seat and the inside wall surface of the car is unnecessary, and, consequently, a wider seat can be installed, if desired, in the car, and the space in the car can be used more effectively.

Since the operating part which moves the thigh support part up and down is provided with the elevating thigh support frame, the operating part is always at a position within easy reach of a passenger's hand and the operation is thereby facilitated.

Since the thigh support part moves up by directly pulling up the thigh support frame or the thigh support part, the construction is quite simple and the cost is accordingly lower. Moreover, the present device is convenient because the thigh support frame can be pulled up by lifting with the hand at any position of the thigh support frame of the thigh support part.

We claim:

1. In a vehicle seat having a seat frame, a thigh support device which comprises:
    a thigh support frame pivotally mounted to said seat frame so as to be freely reciprocally pivotal with respect to said seat frame in the up and down directions; and
    a lock mechanism mounted along said seat frame for controlling the pivoting of said thigh support, said lock mechanism including
    a shaft rotatably mounted with respect to said seat frame and horizontally disposed with respect to said thigh support frame,
    a lock piece pivotally fixed to said rotatable shaft and being pivotally connected to said thigh support frame
    a freely pivotable stopper mounted on said thigh support frame and engagable with said lock piece, said lock piece and stopper having a locking position and a non-locking position with respect to each other, said pivotally fixed lock piece being biased toward said stopper in said locking position, and
    a lock release lever including a bore with a camming surface through which a lock control pin projecting from said stopper passes for camming engagement with said bore to engage and push said stopper upon actuation of said lever in said non-locking position with respect to siad lock piece to thereby release said lock piece from said locking position,
    whereby said thigh support frame is movable in the up direction with respect to said seat frame by grasping said thigh support frame at substantially any point along the length of said thigh support frame while said lock piece and said stopper are in one of said locking and unlocking positions, and by pivoting said thigh support frame to a selected position with respect to said seat frame.

2. The thigh support device in accordance with claim 1 wherein said lock piece is pivotally affixed to said thigh support frame and is provided with a plurality of lock slots formed in the up and down directions on one side of said lock piece centering round said rotating shaft, said lock slots including an end slot on said lock piece for receipt of said stopper in said locking position and said stopper being biased in the direction of engagement with said slot locks.

3. The thigh support device in accordance with claim 2 wherein said stopper is engagable with said plurality of lock slots of said lock piece.

4. The thigh support device in accordance with claim 3 wherein said lock mechanism further includes a bracket to which said lockpiece and said stopper are freely pivotally connected, said bracket having an elongated slot formed therethrough, said lock control pin being insertable through said elongated slot and into said bore of said lock release lever said lock release lever being operable to rotate said pin through said camming surface of said bore so that said stopper is moved in said non-locking position.

5. The thigh support device in accordance with claim 2 wherein said pivotally fixed lock piece is biased in the locking direction through said rotating shaft which is provided with a return spring for rotating said shaft after release from said locking position so that said stopper may engage with one of said end lock slots of said lock piece.

6. The thigh support device in accordance with claim 1 wherein a gripping part is mounted on said thigh support frame in position to be grasped and pulled in the up direction so as to pull up said attached thigh support frame with ease.

* * * * *